(12) United States Patent
Stifel et al.

(10) Patent No.: US 11,923,524 B2
(45) Date of Patent: Mar. 5, 2024

(54) COOLING MODULE FOR A CELL STACK, AND A CELL STACK

(71) Applicant: ElringKlinger AG, Dettingen (DE)

(72) Inventors: Torsten Stifel, Haigerloch (DE); Björn Betz, Trochtelfingen (DE); Martina Bulat, Stuttgart (DE); Stefan Dwenger, Reutlingen (DE); Matthias Biegerl, Nürtingen (DE); Melanie Kemnitz, Limburg (DE); Christian Wörsdörfer, Runkel-Dehrn (DE); Holger Keller, Weilburg-Waldhausen (DE)

(73) Assignee: ElringKlinger AG, Dettingen (DE)

( * ) Notice: Subject to any disclaimer, the term of this patent is extended or adjusted under 35 U.S.C. 154(b) by 0 days.

(21) Appl. No.: 16/904,766

(22) Filed: Jun. 18, 2020

(65) Prior Publication Data
US 2020/0321671 A1 Oct. 8, 2020

Related U.S. Application Data

(63) Continuation of application No. PCT/EP2018/085317, filed on Dec. 17, 2018.

(30) Foreign Application Priority Data

Dec. 20, 2017 (DE) ..................... 10 2017 223 476.8

(51) Int. Cl.
| | |
|---|---|
| *H01M 10/6557* | (2014.01) |
| *H01M 10/613* | (2014.01) |
| *H01M 10/63* | (2014.01) |
| *H01M 10/647* | (2014.01) |
| *H01M 10/6555* | (2014.01) |

(Continued)

(52) U.S. Cl.
CPC ..... *H01M 10/6557* (2015.04); *H01M 10/613* (2015.04); *H01M 10/63* (2015.04); *H01M 10/647* (2015.04); *H01M 10/6555* (2015.04); *H01M 10/6567* (2015.04); *H01M 50/209* (2021.01); *H01M 50/211* (2021.01); *H01M 50/262* (2021.01); *H01M 50/291* (2021.01);

(Continued)

(58) Field of Classification Search
None
See application file for complete search history.

(56) References Cited

U.S. PATENT DOCUMENTS

| | | | |
|---|---|---|---|
| 5,404,270 | A | 4/1995 | Carlstedt |
| 7,531,269 | B2 | 5/2009 | Wegner |

(Continued)

FOREIGN PATENT DOCUMENTS

| | | |
|---|---|---|
| DE | 692 11 538 T2 | 9/1992 |
| DE | 102 23 782 A1 | 12/2003 |

(Continued)

OTHER PUBLICATIONS

"Snap-Fit NPL" https://www.researchgate.net/publication/340294908_Elastic_basis_of_a_simple_snap-fit_design (Year: 2022).*

*Primary Examiner* — Lisa S Park
(74) *Attorney, Agent, or Firm* — ASLAN LAW, P.C.

(57) ABSTRACT

The present invention relates to the field of electrical energy storage devices and in particular enables simplified manufacture and/or optimised operation thereof in that a cooling module, a cell stack, the entire electrical energy storage device and/or a method for cooling cells are optimised.

13 Claims, 9 Drawing Sheets

(51) Int. Cl.
*H01M 10/6567* (2014.01)
*H01M 50/209* (2021.01)
*H01M 50/211* (2021.01)
*H01M 50/262* (2021.01)
*H01M 50/291* (2021.01)
*H01M 50/293* (2021.01)
*H01M 10/48* (2006.01)

(52) U.S. Cl.
CPC ........ *H01M 50/293* (2021.01); *H01M 10/482* (2013.01)

(56) References Cited

U.S. PATENT DOCUMENTS

| | | | |
|---|---|---|---|
| 8,460,815 | B2 | 6/2013 | Oury et al. |
| 8,685,558 | B2 | 4/2014 | Fuhrmann et al. |
| 8,709,636 | B2 | 4/2014 | Oury |
| 8,790,808 | B2 | 7/2014 | Herrmann et al. |
| 9,531,043 | B2 | 12/2016 | Corson |
| 10,103,415 | B2 | 10/2018 | Ottomano et al. |
| 2011/0293982 | A1 | 12/2011 | Martz et al. |
| 2011/0293985 | A1 | 12/2011 | Champion et al. |
| 2012/0171545 | A1 | 7/2012 | Hohenthanner et al. |
| 2013/0022855 | A1 | 1/2013 | Hsiao et al. |
| 2013/0071720 | A1 | 3/2013 | Zahn |
| 2013/0143093 | A1 | 6/2013 | Teng et al. |
| 2013/0330577 | A1 | 12/2013 | Kristofek et al. |
| 2014/0045005 | A1* | 2/2014 | Schumann ............ H01M 50/10 429/61 |
| 2017/0297431 | A1 | 10/2017 | Epstein et al. |

FOREIGN PATENT DOCUMENTS

| | | |
|---|---|---|
| DE | 10 2008 027 293 A1 | 12/2009 |
| DE | 10 2008 032 086 A1 | 1/2010 |
| DE | 10 2009 016 866 A1 | 10/2010 |
| DE | 10 2010 021 922 A1 | 12/2011 |
| DE | 10 2011 108 009 A1 | 2/2012 |
| DE | 10 2011 102 494 A1 | 3/2012 |
| DE | 10 2012 021 990 A1 | 7/2013 |
| DE | 10 2012 200 400 A1 | 7/2013 |
| DE | 10 2013 212 851 A1 | 1/2015 |
| DE | 10 2013 017 355 A1 | 4/2015 |
| DE | 11 2015 004 541 T5 | 6/2017 |
| DE | 10 2017 101 305 A1 | 8/2017 |
| EP | 2 390 951 A1 | 11/2011 |
| EP | 2 669 990 A1 | 12/2013 |
| EP | 3 070 780 A1 | 3/2015 |
| JP | 2013 120827 A | 6/2013 |
| WO | WO 2013/057952 A1 | 4/2013 |

\* cited by examiner

COOLING MODULE FOR A CELL STACK, AND A CELL STACK

RELATED APPLICATION

This application is a continuation of international application No. PCT/EP2018/085317 filed on Dec. 17, 2018, and claims the benefit of German application No. 10 2017 223 476.8 filed on Dec. 20, 2017, which are incorporated herein by reference in their entirety and for all purposes.

FIELD OF DISCLOSURE

The present invention relates among other things to the field of electrical electrical energy storage devices that have in particular cells stacked in a stack direction. Depending on a required capacity and power of the electrical energy storage device, it is indispensable to cool the cells. Cooling modules are used in particular for this.

SUMMARY OF THE INVENTION

The object of the present invention is to develop existing electrical electrical energy storage devices and components thereof to simplify manufacture and to optimise functioning.

This object is achieved according to the invention by the subject-matter of Claim 1.

For example, it may be provided for a cooling module for a cell stack, in particular an accumulator cell stack, to include a cooling element for receiving and passing on a coolant.

The cooling element serves in particular for cooling one or more cells of the cell stack but may also be used for warming one or more cells of the cell stack, for example in order to bring the cell stack up to an optimum operating temperature rapidly in a start-up phase, or in order to prevent the cells from freezing at very cold ambient temperatures.

Preferably, the cooling element includes two plate-like flexible layers that form an outer casing of the cooling element.

The plate-like flexible layers of the cooling element are oriented for example substantially parallel to one another, and in particular each extend substantially in a plane that is oriented transversely, in particular perpendicular, to a stack direction.

The layers are preferably connected to one another in fluid-tight manner in a peripheral edge region, and surround an internal space of the cooling element.

The peripheral edge region preferably lies in a plane that extends perpendicular to the stack direction and/or takes a substantially rectangular form.

In particular, it may be provided for the cooling element to take a substantially rectangular and/or cuboid form.

The cooling element is preferably a flexible cooling bag.

In particular in a central region in the middle of the cooling element—that is to say at a spacing from the peripheral edge region—the cooling element is preferably of variable thickness—that is to say a spacing between the two layers may vary.

For example, it may be provided for the two layers of a cooling element that form an outer casing of the cooling element to be seal welded in the peripheral edge region and/or to be connected to one another and/or sealed by being overmoulded with plastics material.

In the edge region, the layers are preferably connected directly to one another. In particular, the layers preferably abut against directly one another.

It may be advantageous if the layers are connected to one another by a substance-to-substance bond.

In one embodiment of the invention, it may be provided for a plate-like flexible layer of the cooling element or both plate-like flexible layers of the cooling element to include a metal sheet or to be formed therefrom.

For example, it may be provided for a material thickness of the layers to be at most approximately 0.5 mm, for example at most approximately 0.3 mm, in particular approximately 0.25 mm.

The material thickness is the result in particular of the sum of a carrier material, for example a metal sheet, and an optional coating.

An inner side and/or an outer side of each layer may be provided for example with a coating. A coating of this kind is in particular an insulating film for electrical insulation and/or a film that enhances adhesion to a cell.

Further, it may be provided for a plate-like flexible layer of the cooling element or both plate-like flexible layers of the cooling element to be formed from or to include a plastics material, in particular an organic sheet.

It may be advantageous if, in a heat transfer region of the cooling element, the cooling element includes one or more spacers for preventing the two layers from abutting flat against one another.

A heat transfer region is in particular a central region of the cooling element that is arranged at a spacing from the edge region.

The one or more spacers preferably have a maximum extent, in a direction of thickness and/or a stack direction, that corresponds to at most approximately 60%, in particular at most approximately 40%, for example at most approximately 25%, of a thickness of the cooling element in the heat transfer region, in particular if the cooling element is in a condition in which the layers of the cooling element that form the outer casing are planar in the heat transfer region and extend substantially parallel to one another.

In this condition of the cooling element, the layers are preferably not deformed either concavely or convexly, in particular in the heat transfer region.

It may be favourable if the one or more spacers are shaped as one or more projections in one or both layers of the cooling element.

In particular, this enables one layer to abut at a point against the further layer in order to impair a cross section of flow between the two layers as little as possible.

As an alternative or in addition thereto, it may be provided for one or more spacers to be formed by a texturing, in particular an embossed pattern, in one of the two layers.

The two layers forming the outer casing of the cooling element preferably take a form that is at least approximately mirror-symmetrical to one another, preferably in relation to a centre plane of the cooling element along which the two layers abut against one another in the edge region.

Further, it may be provided for the two layers to take a mutually identical form and merely to be arranged in different rotational orientations in order ultimately to be connected to one another.

It may be favourable if the layers each include a spigot for supplying coolant and/or a spigot for discharging coolant.

In particular, there may be provided a spigot that is part of a supply duct for supplying coolant to the internal space of the cooling element. As an alternative or in addition thereto, there may be provided a spigot that is part of a discharge duct for discharging coolant from the cooling element.

One or more spigots, in particular all the spigots, preferably take the form of a passage aperture made in the respective layer.

Each of these passage apertures is preferably surrounded by a collar-shaped projection shaped to protrude from the layer.

Each layer, together with the spigots provided therein or thereon, is thus made in particular in one piece with the spigots, for example in a single manufacturing step.

In particular, a stamping procedure, embossing procedure and/or deep-drawing procedure may be provided for shaping a layer together with the spigots.

The collar-shaped projections comprising the spigots are also referred to simply as "collars" below.

The collar of each spigot preferably protrudes away from the internal space of the cooling element.

In particular, the collar includes a cylindrical portion, preferably a circle-cylindrical portion.

An axis of rotation in relation to which the collar preferably takes a rotationally symmetrical form is preferably arranged perpendicular to two principal directions of extent of the layers, perpendicular to a centre plane of the cooling element and/or parallel to a stack direction.

The supply opening and the discharge opening are preferably arranged at mutually opposing positions on the peripheral edge region of the cooling element.

In particular, the supply opening and the discharge opening are arranged diagonally opposite one another.

Preferably, in an edge region in which the layers are connected to one another, the layers have recesses, indentations and/or spray-through openings for fixing a carrier element with positive engagement.

In the region of the recesses, indentations and/or spray-through openings, the layers are preferably connected to one another in fluid-tight manner. In particular, an internal space of the cooling element is preferably not accessible through the recesses, indentations and/or spray-through openings.

In one embodiment, it may be provided for the internal space to include a distributor duct extending away from a supply opening, and/or a collecting duct extending towards a discharge opening, wherein a heat transfer region of the cooling module is formed between the supply opening and the discharge opening, in particular between the distributor duct and the collecting duct.

The distributor duct and the collecting duct are preferably arranged parallel to one another.

In particular, the distributor duct and the collecting duct are arranged and/or constructed on mutually opposing sides of a heat transfer region of the cooling module.

The distributor duct and/or the collecting duct may in particular be lateral abutments for the cell in the event of (undesired) movement thereof in relation to the cooling element.

It may be advantageous if a cell terminal or both cell terminals of at least one cell are guided out through a distributor duct. The one or both the cell terminals are in that case coolable in particular by means of the distributor duct.

It may be provided for the distributor duct to take a form that tapers in the flow direction of the coolant. As an alternative or in addition thereto, it may be provided for the collecting duct to take a form that widens in the flow direction of the coolant.

A heat transfer region of the cooling element preferably has, in the direction of thickness, an average thickness in terms of space and/or time (extent in the direction of thickness and/or stack direction) of at most approximately 20 mm, for example at most approximately 15 mm, in particular at most approximately 10 mm.

The cooling module is particularly suitable for use in a cell stack, where it preferably serves for controlling the temperature of cells, in particular accumulator cells.

The cell stack is thus in particular an accumulator cell stack.

The present invention therefore also relates to a cell stack, which includes in particular the following:
 a plurality of cells, in particular accumulator cells;
 a plurality of cooling modules, in particular cooling modules according to the invention, for cooling the cells.

The cells and the cooling modules are preferably stacked on top of one another in a stack direction, in particular alternately.

The term "alternately stacked" should be understood in particular to mean that one, two or more than two cells are succeeded in the stack direction by one, two or more than two cooling modules, then again one, two or more than two cells, then one, two or more than two further cooling modules, etc. For example, the following arrangements may be provided:
 ABABABABA etc. or
 ABBABBABBABBA etc. or
 BAABAABAABAABAAB etc.,
 where "A" designates a cooling module and "B" designates a cell.

In particular, direct contact is provided between the at least one cell, the succeeding at least one cooling module, then again at least one cell, then the at least one further cooling module, etc.

The cells of the cell stack are in particular so-called pouch cells and/or prismatic cells.

The term "pouch cell" is understood in the context of this description and the accompanying claims to mean in particular a cell that includes an outer casing made of an in particular metal material, for example a metal foil.

The material of the outer casing, in particular a metal foil, is preferably welded in an edge region.

A pouch cell preferably takes the form of a bag.

It may be favourable if a pouch cell takes a substantially rectangular form as seen in plan view, in particular parallel to a stack direction.

Preferably, a pouch cell has a thickness parallel to a stack direction that corresponds to at most approximately 30%, preferably at most approximately 20%, of a width of the pouch cell perpendicular to a stack direction.

A prismatic cell preferably includes an electrode stack that in each case includes a plurality of plate-like electrodes.

Plate-like electrodes of a prismatic cell preferably each extend in a plane.

Pouch cells and/or prismatic cells are in particular cells in conformance with DIN 91252.

It may be favourable if the cooling elements are in fluidic connection with one another by means of connecting elements.

The connecting elements are preferably push-in elements.

As an alternative or in addition thereto, it may be provided for the connecting elements each to have two joining portions that are arranged and/or constructed at mutually opposing ends of the respective connecting element.

Each joining portion is preferably fixed to a respective cooling element.

Each joining portion preferably takes a form that substantially complements a spigot that is arranged and/or constructed on the respective cooling element.

Preferably, each joining portion is fixed or fixable to the respective cooling element by being pushed into the spigot.

It may be favourable if the connecting elements form positioning elements by means of which the cooling elements are positionable in the stack direction and/or in one or two directions extending perpendicular to the stack direction.

Further, the connecting elements preferably form support elements for supporting the cooling elements on top of one another in the stack direction.

For this purpose, the connecting elements have in particular one or more support rings that for example take the form of radially outwardly protruding positioning projections.

A connecting element preferably includes a base body, which is in particular an injection moulded plastics component.

The base body takes an in particular substantially rotationally symmetrical form and includes one, two or more than two annular grooves for receiving one or more sealing elements, in particular sealing rings, for example O rings.

Two cooling elements that are connected to one another by means of a connecting element abut in particular against mutually remote abutment faces of the support ring of the connecting element, and are thus positioned in relation to one another in the stack direction. In particular, this enables a predetermined spacing to be ensured between the two cooling elements, at least in the region of the spigots.

Moreover, by means of a connecting element a spigot of the one cooling element is positioned in relation to the spigot of the further cooling element preferably such that the two spigots and the connecting element have a common axis of rotation, wherein the axis of rotation extends in particular parallel to the stack direction.

It may be provided for the cooling elements to form, together with the connecting elements, at least one supply duct for supplying coolant to the cooling elements and/or at least one discharge duct for discharging coolant from the cooling elements.

Both the at least one supply duct and also the at least one discharge duct preferably take a substantially linear form and/or are oriented at least approximately parallel to the stack direction.

The at least one supply duct and/or the at least one discharge duct are preferably guided past the cells that are arranged between the cooling elements.

In particular, the cells are preferably dimensioned such that they can be substantially completely covered by the heat transfer region of the cooling elements.

Further, the present invention relates to a cooling module that includes a cooling element for receiving and passing on a coolant. Preferably, the cooling module includes a carrier element to which the cooling element is fixed, wherein the carrier element is or includes in particular an injection moulded plastics element that is fixed to the cooling element by being moulded onto it.

Thus, the cooling element is in particular an inlaid piece that is overmoulded with plastics material during manufacture of the carrier element.

The carrier element is preferably a frame element that annularly surrounds the cooling element at the edge region thereof.

Here, the term "annular" relates in particular to a closed shape. Preferably, a rectangular cross section of the frame element and/or of the cooling element, taken substantially perpendicular to a stack element, is provided.

It may be advantageous if the carrier element includes one or more, for example four, corner elements that are in particular moulded directly onto the cooling element.

The corner elements are preferably inherently inflexible and preferably have a reinforcing structure.

In particular, the corner elements are fixed to the cooling element without any possibility of relative movement in relation to the cooling element.

One or more corner elements preferably include a reinforcing structure, such that the one or more corner elements withstand a compressive force acting in the stack direction.

It may be provided for one or more corner elements to be provided with inserts and/or inlays.

In particular, a sleeve taking the form of an insert or inlay and serving to receive a clamping element, in particular a clamping rod of a clamping device, may be provided.

In one embodiment of the invention, it may be provided for the carrier element to include one or more stacking regions by means of which a plurality of carrier elements of the same construction are stackable on top of one another in a stack direction.

The one or more stacking regions are in particular integrated into the one or more corner elements.

It may be favourable if, by means of a plurality of carrier elements of a plurality of cooling modules, a stack of carrier elements is formable.

In particular, a stack of carrier elements and/or a cell stack is formable by using a plurality of cooling modules of the same construction, a plurality of carrier elements of the same construction, a plurality of cells of the same construction, etc.

The one or more stacking regions preferably each include at least one reinforcing region and/or at least one clamping portion for clamping a plurality of carrier elements together by means of a clamping device.

In particular, the one or more stacking regions includes a through aperture for a clamping rod to pass through.

Further, it may be provided for the carrier element, in particular one or more corner elements, to include a positioning aid for correct positioning of the carrier elements when they are stacked.

A positioning aid may for example be a projection, a spike and/or a groove, wherein an upper or front side of the carrier element, as seen in the stack direction, takes a form that at least in certain regions complements a lower or rear side of the carrier element, as seen in the stack direction. A plurality of carrier elements of the same construction can thus easily be stacked on top of one another and hence be positioned in relation to one another relatively easily.

The carrier element preferably includes one or more, for example four, side parts that each include one or more anchoring portions for anchoring the carrier element on the cooling element.

It may be favourable if respectively mutually opposing side parts are oriented at least approximately parallel to one another.

Preferably, in each case two side parts are connected to one another by means of a corner element, in particular at an angle of approximately 90°.

Two side parts that are connected to one another by means of a corner element are preferably arranged substantially at a right angle to one another.

It may be favourable if four corner elements and four side parts form an annularly closed frame element that is substantially rectangular, as seen in a cross section taken perpendicular to a stack direction.

The one or more anchoring portions preferably each include the following:
- one or more moulded-on elements, which are moulded directly onto the cooling element; and
- one or more web elements for connecting the moulded-on elements to a wall portion of a side part of the carrier element.

Preferably, the web element protrudes substantially perpendicular to a stack direction and/or substantially perpendicular to an edge region of the cooling element in which the respective moulded-on element is fixed, and away from the respective moulded-on element.

The wall portion of the side part is preferably arranged at a spacing from the edge region of the cooling element, and is connected to the cooling element only by means of the web element.

It may be provided for the carrier element to include one or more side parts that each include one or more compensation regions, which are constructed to yield resiliently in a peripheral direction of the carrier element in which the carrier element surrounds the cooling element.

The one or more compensation regions serve in particular to compensate for a different thermal expansion of the cooling element on the one hand and the carrier element on the other, in particular in order to avoid as far as possible stresses between the carrier element and the cooling element.

The compensation regions act resiliently in particular in a plane extending perpendicular to the stack direction. This enables in particular the different thermal expansions in the principal directions of extent of the cooling element to be compensated.

The compensation regions are formed in particular by an undulating structure in a wall portion of the side part, since the undulating structure can easily produce variability in the length of the wall portion.

The material of the carrier element is in this case preferably selected such that the undulating wall portion is resiliently deformable and thus configured to be made longer or shorter.

It may be provided for the carrier element to include one or more side parts that each include a plurality of anchoring portions and a plurality of compensation regions.

The anchoring portions and the compensation regions are preferably arranged alternately in a peripheral direction of the carrier element in which the carrier element surrounds the cooling element.

In one configuration of the invention, it is provided for the carrier element to include four corner elements and four side parts, each connecting two corner elements to one another, wherein the corner elements and the side parts jointly form a frame element surrounding the cooling element.

Preferably, the carrier element forms a wall portion of a housing of a cell stack and/or an electrical energy storage device.

In particular, it may be provided for the wall portion to have at least in part an undulating structure, wherein as a result of the undulating structure a plurality of compensation regions are formed for the equalisation of thermal expansions which differ as a result of the materials.

The wall portion extends preferably continuously from one corner element to a further corner element and preferably over an entire height of the carrier element.

The cooling module described above is suitable in particular for use in a cell stack, in particular an accumulator stack, wherein the cell stack includes a plurality of cells and a plurality of cooling modules, in particular cooling modules according to the invention, for cooling the cells.

It may be favourable if a stack height of the carrier element corresponds at least approximately to a total of a thickness of at least one cooling element in a heat transfer region on the one hand and a thickness of at least one cell on the other.

In this context, a stack height of the carrier element is in particular a spacing between a centre plane of a first carrier element, oriented perpendicular to a stack direction, on the one hand and a centre plane of a further carrier element that is stacked on the first carrier element, oriented perpendicular to the stack direction, on the other.

A thickness of the cooling element and/or the cell is in particular an average thickness in a normal condition of the cooling element and/or the cell when the mutually adjoining surfaces of the cooling element and the cell are oriented such that they are substantially planar and parallel to one another.

A cell is preferably substantially rectangular, as seen in a cross section taken perpendicular to the stack direction.

In the stacked condition, the carrier elements of the cooling modules preferably form a side wall of a housing encasing the cells and the cooling elements, wherein the side wall is at least approximately uninterrupted in both a stack direction and a peripheral direction.

It may be advantageous if each carrier element includes in each case one or more through apertures through which cell terminals of the cells are guidable or guided out of the housing to the outside.

It may further be advantageous if the cell stack includes a stack of carrier elements that is provided at both ends with a respective end plate, wherein the two end plates form or include clamping plates between which the carrier elements are clamped together.

In particular, one or more clamping rods, in particular two or four clamping rods, may be provided for clamping the stack of carrier elements together between the two end plates.

A clamping rod is in particular a threaded rod that, by means of one or more associated threaded nuts, embrace and hence clamp together the stack of carrier elements in the stack direction.

In one configuration of the invention, it may be provided for a cell stack to include a plurality of cells and a plurality of cooling modules, in particular cooling modules according to the invention, for cooling the cells, wherein in each case at least one cell is fixed by being held between in each case at least two cooling elements of two cooling modules.

In this way, the cooling elements preferably form a holding device for fixing the respective at least one cell.

It may be advantageous if the cells are fixed in a stack direction exclusively by being held by means of the cooling elements.

The cooling elements and the cells are preferably arranged alternately in a stack direction of the cell stack, and in particular abut directly against one another.

It may be advantageous if the cooling elements take a flexible form. The shape of the cooling elements is preferably adapted to the shape of the respectively adjacent at least one cell.

In particular, the cooling elements are constructed and/or arranged, at least in certain regions, to substantially complement the shape of the respectively adjacent cells.

It may be favourable if the cell stack includes as a load-bearing structure a plurality of carrier elements that are stacked in a stack direction.

The cooling elements are preferably fixed directly to the carrier elements.

In particular, the carrier elements are frame elements that peripherally surround the cooling elements in a peripheral direction of the cooling elements, in particular in relation to a plane extending perpendicular to the stack direction.

The carrier elements, in particular the frame elements, are preferably substantially rectangular, in particular as seen in a cross section taken perpendicular to the stack direction.

The carrier elements are preferably connected such that they engage positively with the cooling elements, in particular being made by being moulded onto the cooling elements by a plastics injection moulding method.

It may be advantageous if the carrier elements jointly form a housing of the cell stack that surrounds the cells and the cooling elements at least on four sides.

In particular, the housing surrounds the cell stack in the radial direction, as seen in relation to the stack direction. In the axial direction, the housing is preferably completed by means of two end plates to form a closed housing.

The cell stack preferably includes cell terminals for making electrical contact with the cells, and these are guided to the outside between in each case two carrier elements.

The term "to the outside" should be understood in particular to mean a guidance such that the cell terminals are guided out of an internal space of the cell stack that is formed by the carrier elements.

It may be advantageous if the cell stack includes a clamping device by means of which it is exclusively the carrier elements that are clamped in the stack direction.

In that case, the cells are preferably kept in position perpendicular to the stack direction at most by the fact that one or more abutment elements preventing undesired displacement in a direction extending perpendicular to the stack direction are provided.

In particular, one or more abutment elements are formed by the carrier element.

Together with the cooling elements, the carrier elements preferably form receptacles for the cells, into which the cells are merely inserted, apart from the action of being held between the cooling elements.

It may be favourable if the cell stack includes a fluid pressurisation device by means of which a pressure is applied or applicable to a coolant guided through the cooling elements, with the result that, in a stack direction of the cell stack, the cells abut on one side or both sides, in each case at least in certain regions, against the respectively adjacent cooling element.

It may be advantageous if the fluid pressurisation device is at the same time a pumping device for driving the coolant that is guided through the cooling elements.

In particular, in this case an additional pressure reducer may be provided by means of which, in combination with the fluid pressurisation device, it is possible to control the pressure and the quantity of coolant guided through the cooling elements, by open and/or closed-loop control.

As an alternative thereto, it may be provided for the fluid pressurisation device to be a device other than a pumping device for the purpose of driving the coolant that is guided through the cooling elements.

It may be advantageous if the fluid pressurisation device includes a plurality of pressure sensors by means of which in particular an input pressure of the coolant supplied to the cooling elements and/or an output pressure of the coolant discharged from the cooling elements is determinable.

The cooling module according to the invention and/or the cell stack according to the invention is suitable in particular for use in an electrical energy storage device.

For this reason, the present invention also relates to an electrical energy storage device that includes one or more cell stacks, in particular one or more cell stacks according to the invention. The cells of the electrical energy storage device are in particular accumulator cells.

It may be favourable if the cell device includes a fluid pressurisation device by means of which a pressure on a coolant guided through the cooling elements is adaptable to an operating state and/or charging state and/or ageing state of the cells.

In particular, an open and/or closed-loop control of the coolant pressure may be provided.

This preferably allows the cells to be reliably received between the cooling elements by being held. At the same time, it is preferably possible to achieve optimum adaptation of the shape of the cooling elements to the cells in order ultimately to enable optimised heat transfer.

In particular, it may be provided for the cooling elements to be so unstable and/or yielding, when they are not filled with coolant and/or in the absence of a pressure applied to the coolant by means of a fluid pressurisation device, that it is no longer possible to receive the cells by holding them. Rather, the holding action is preferably only produced when the cooling elements are filled with coolant and/or when a pressure is applied by means of the fluid pressurisation device.

An electrical energy storage device, which optionally includes individual or a plurality of the features of the electrical energy storage device described above, may further include the following:

a cell stack which is in particular according to the invention and includes a plurality of cells taking the form of accumulator cells, and a plurality of cooling modules, in particular cooling modules according to the invention, for cooling the cells, wherein the cooling modules each have at least one flexible cooling element that abuts against the cell.

Further, the electrical energy storage device preferably includes a measuring device for determining a total quantity of a coolant found in at least one of the cooling elements of the cooling modules.

In particular, it may be provided for a volume of an internal space within the at least one cooling element to be determinable by means of the measuring device. As an alternative or in addition thereto, it may be provided for a total mass of the coolant found in the at least one cooling element to be determinable by means of the measuring device.

An internal space volume may be determined in particular using an equalisation tank, for example if a total quantity of all the coolant that is present is known.

In particular, the measuring device preferably includes an equalisation tank for receiving coolant. The measuring device is preferably configured such that the total quantity of coolant found in the at least one cooling element is deducible from a filling level in the equalisation tank.

In particular for determining the total mass of coolant found in the at least one cooling element, in particular a balance or other weight measuring device may be provided. For example, by uncoupling the cell stack from an equalisation tank for the purpose of receiving coolant, it is possible to use a weight sensor to deduce the total mass of coolant found in the at least one cooling element.

The measuring device is preferably configured to allow one or more correction factors to be taken into account, in particular a correction pertaining to the heat expansion and/or a varying pressure.

It may be favourable if the electrical energy storage device includes a fluid pressurisation direction by means of which a pressure within the at least one cooling element is adjustable, in particular being controllable by open or closed-loop control to give a predetermined pressure.

The measuring device is preferably constructed and set up such that a compression state or expansion state of at least one cell abutting against the at least one cooling element is deducible from the determined total quantity of coolant found in the at least one cooling element.

The measuring device is preferably constructed and set up such that a state of at least one cell that is cooled by means of the at least one cooling element is deducible from the determined total quantity of coolant found in the at least one cooling element.

It may be advantageous if the measuring device is configured such that a charging state and/or operating state and/or ageing state of the at least one cell is deducible.

Preferably, the cells and the cooling elements together extend in a stack direction of the cell stack over a substantially invariable length.

Thus, the cooling elements are preferably compressed when the cell is expanded, and vice versa.

Further, the present invention relates to a method for cooling cells for example taking the form of accumulator cells. The method preferably includes the following:

supplying a coolant to at least one cooling element of a cooling module;
transferring heat from at least one cell to the cooling element or from the cooling element to the at least one cell;
determining a total quantity of a coolant found in the at least one cooling element.

The method according to the invention preferably has individual or a plurality of the features and/or advantages described in conjunction with the described cooling modules, cell stacks and/or electrical energy storage device.

Further, the described cooling modules, cell stacks and electrical electrical energy storage devices are preferably suitable for carrying out the described method.

It may be provided for a total volume of the coolant found in the at least one cooling element to be determined. As an alternative or in addition thereto, it may be provided for a total mass of the coolant found in the at least one cooling element to be determined.

The determined total quantity is preferably used to determine an operating state and/or charging state and/or ageing state of the at least one cell. More extensive operation, in particular more extensive use, of the at least one cell is controlled by open and/or closed-loop control preferably in dependence on the determined operating state and/or charging state and/or ageing state of the at least one cell.

Further, for a plurality of cooling elements of a plurality of cooling modules, it may be provided for the quantity of coolant respectively found therein to be determined separately, in particular in order to determine therefrom an operating state and/or charging state and/or ageing state for each cell separately.

Further preferred features and/or advantages of the invention form the subject matter of the description below and the illustration in the drawings of an exemplary embodiment:

BRIEF DESCRIPTION OF THE DRAWINGS

Like or functionally equivalent elements are provided with the same reference numerals in all the Figures.

DETAILED DESCRIPTION OF THE DRAWINGS

Figure 1:
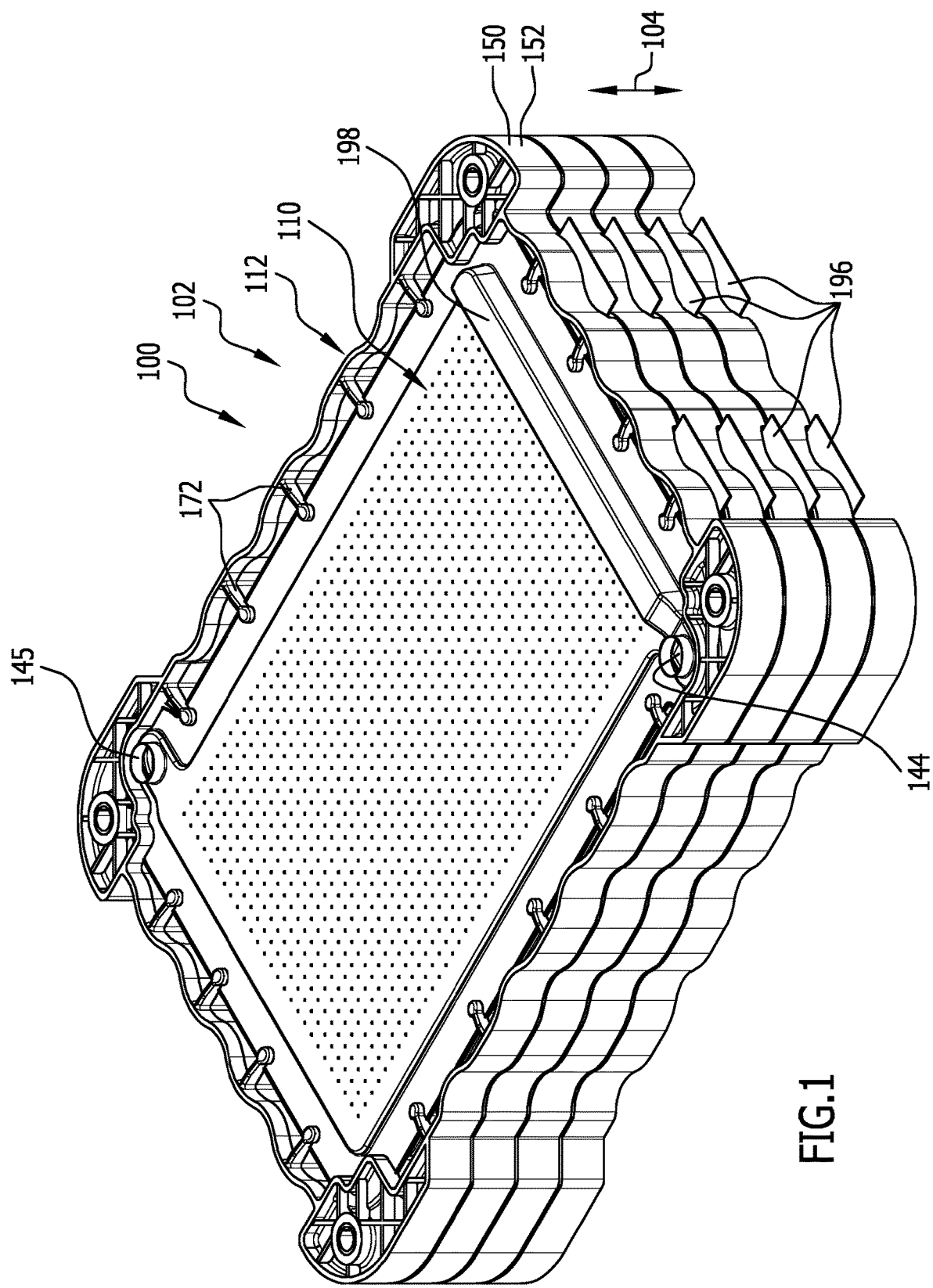
FIG. 1 shows a schematic perspective illustration of a cell stack of an electrical energy storage device, wherein the cell stack includes a plurality of carrier elements stacked on top of one another, for receiving cooling elements of the cooling modules, and a plurality of cells arranged between the cooling elements.
Figure 2:
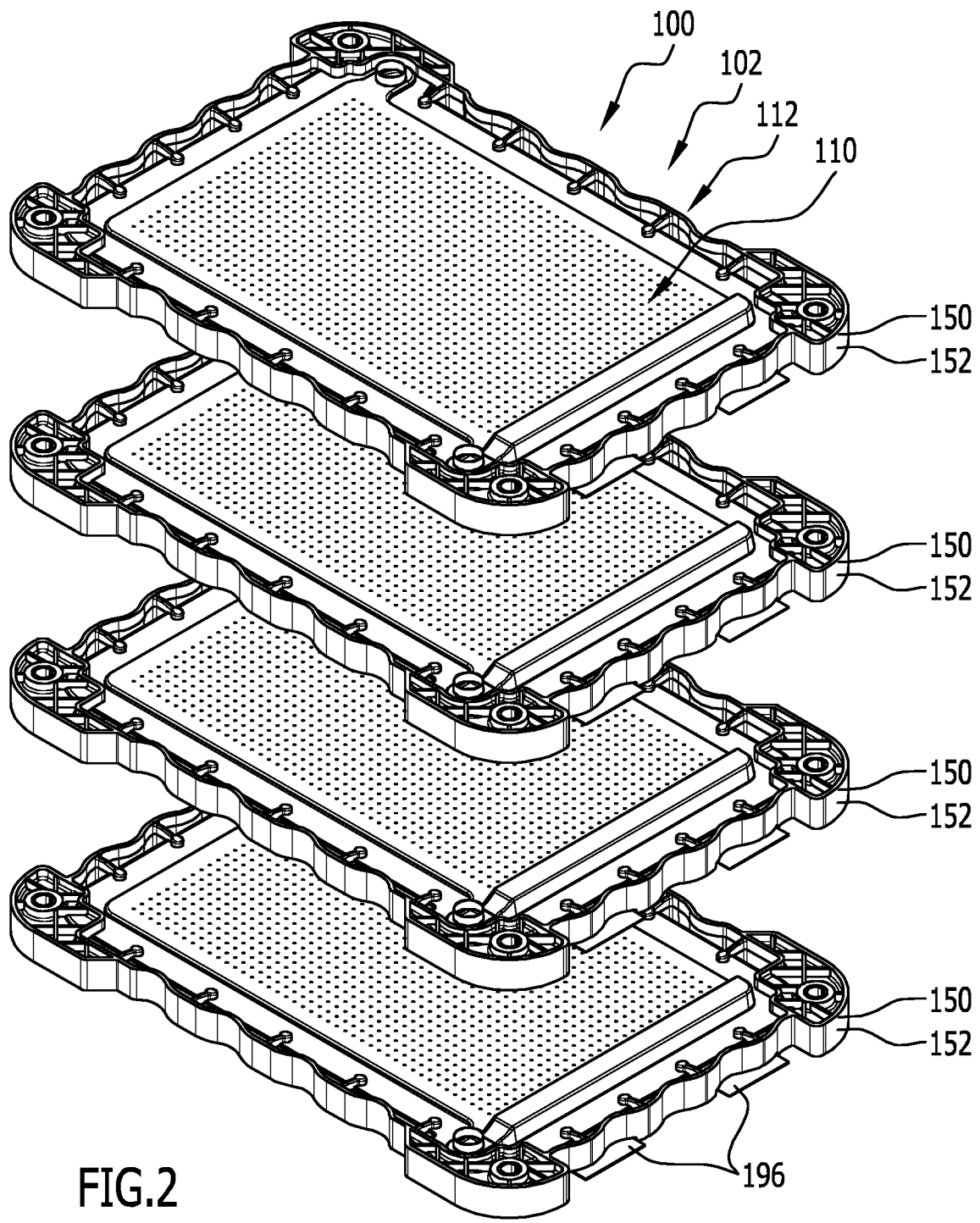
FIG. 2 shows a schematic perspective illustration of a plurality of mutually separated carrier elements, together with the cooling elements arranged thereon.

An embodiment, illustrated in FIGS. 1 to 9, of an electrical energy storage device that is designated 100 as a whole serves in particular to store electrical energy, and is used for example as an energy storage unit in electric vehicles.

The electrical energy storage device 100 includes a cell stack 102, which includes a plurality of cells 106 stacked in a stack direction 104.

The cells 106 are in particular so-called pouch cells 108 and/or prismatic cells.

A respective cooling element 110 of a cooling module 112 of the cell stack 102 is arranged in each case between two cells 106.

In this way, in particular a plurality of cooling modules 112 with cooling elements 110 on the one hand and cells 106 on the other are stacked on top of one another such that they alternate in the stack direction 104.

Here, the cooling elements 110 and the cells 106 abut against one another preferably over a large surface, in order to enable optimised heat transfer.

In the context of this description and the accompanying claims, the term "abut against one another over a large surface" is understood in particular to mean that the cooling elements 110 and the cells 106 abut against one another over a continuous part of a surface of the cooling elements 110 and the cells 106 of at least approximately 2 cm by 2 cm, in particular at least approximately 2 cm by 3 cm, preferably at least approximately 2 cm by 4 cm. For example, the cooling elements 110 and the cells 106 abut against one another over a continuous part of a surface of the cooling elements 110 and the cells 106 of at least approximately 4 $cm^2$, in particular at least approximately 6 $cm^2$, preferably at least approximately 10 $cm^2$.

Figure 3:
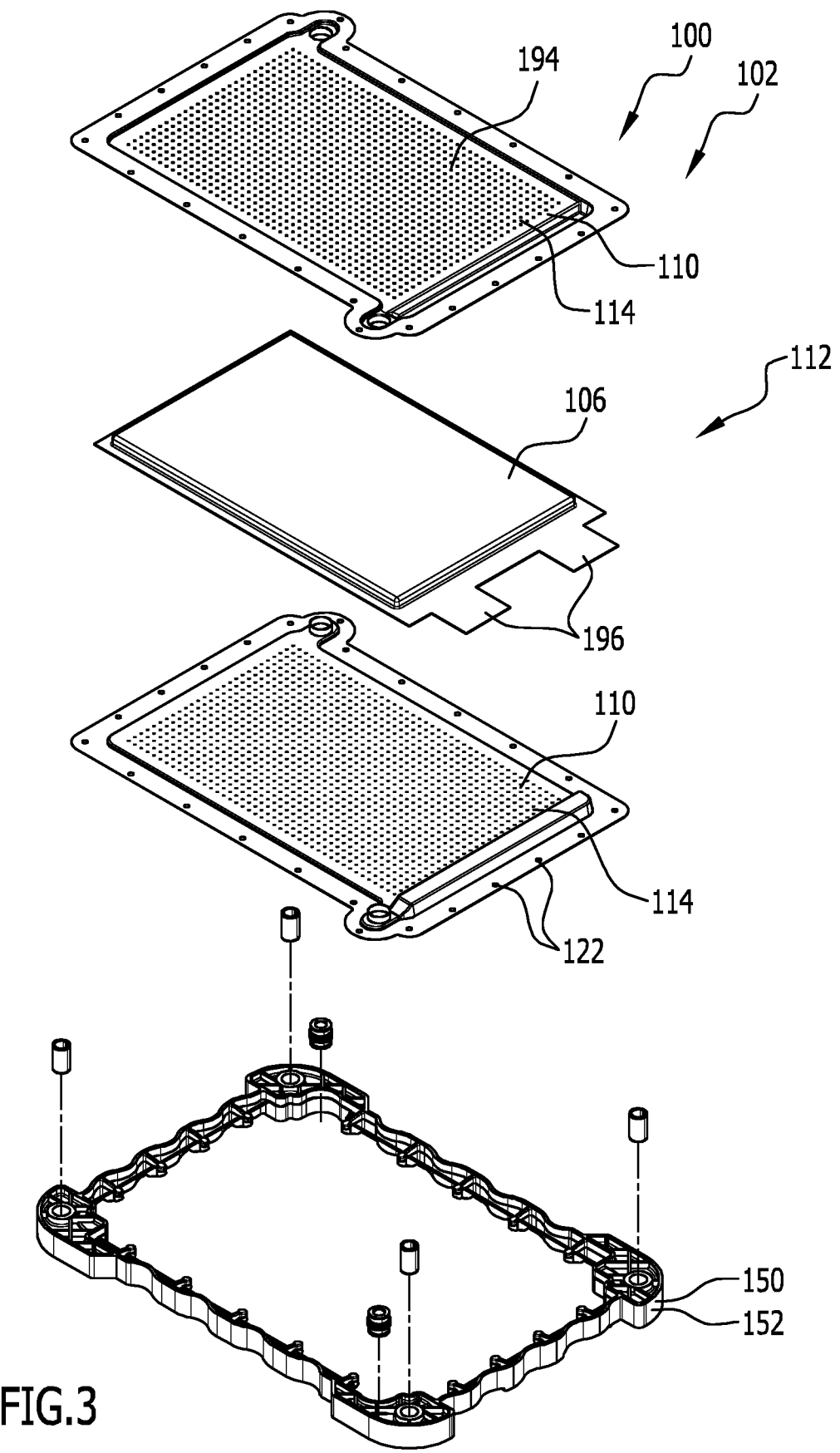
FIG. 3 shows a schematic perspective illustration of a carrier element, a layer of a cooling element to be arranged on the carrier element, a cell, and a layer of a further cooling element.
Figure 7:
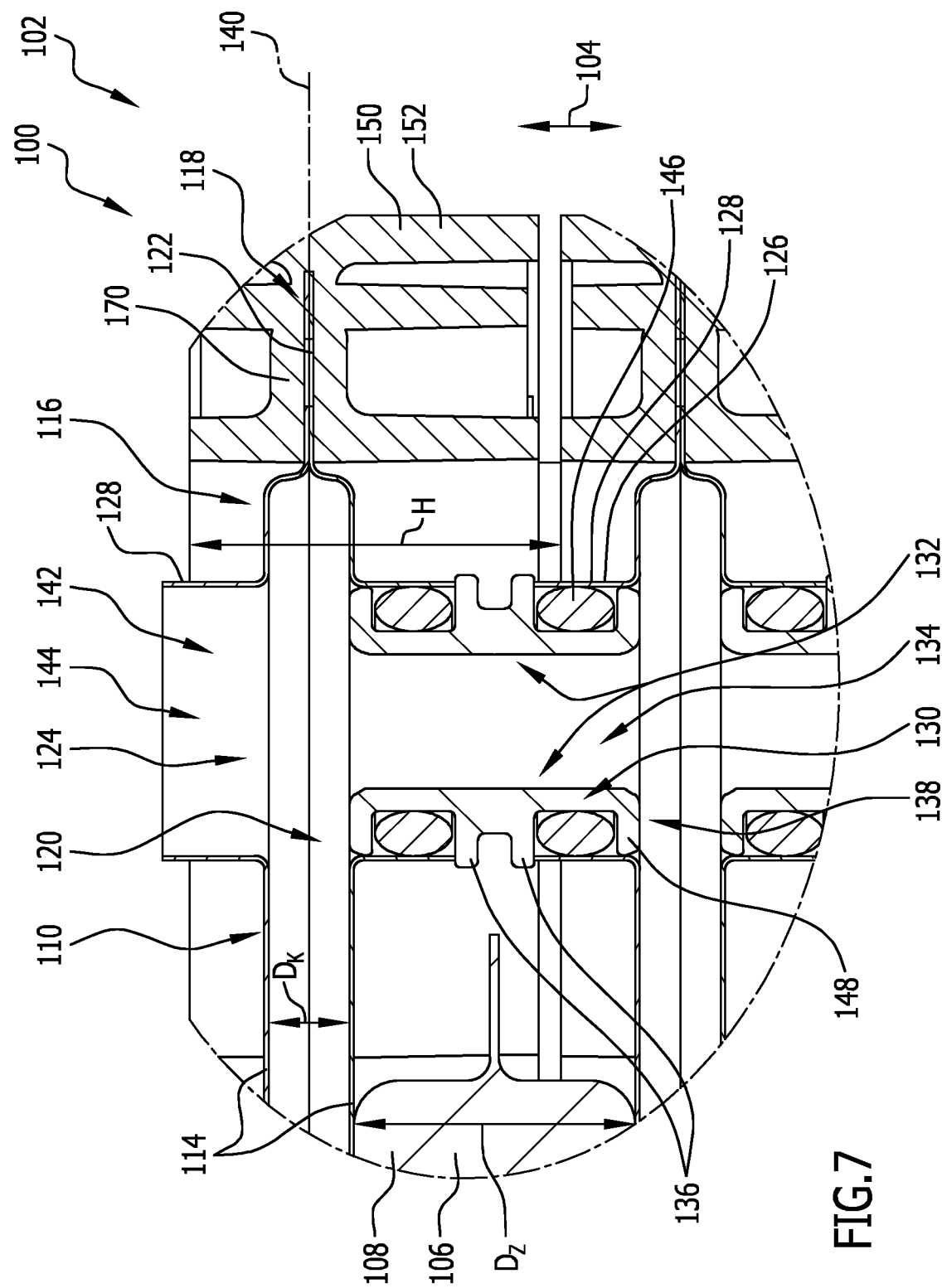
FIG. 7 shows an illustration on a larger scale, of the region VII in FIG. 6.

As can be seen in particular from FIGS. 3 and 7, each cooling element 110 includes two layers 114, which together form an outer casing 116 of the cooling element 110.

The layers 114 are made in particular of a metal material, or include such a material. In particular, the layers 114 take the form of layers of sheet metal.

Here, the layers 114 are in particular given a shape resulting in a peripheral, preferably substantially rectangular, edge region 118 in which the two layers 114 abut against one another. Further, as a result of the selected shape of the layers 114 there is produced an internal space 120 of the cooling element 110 that is formed between the two layers 114 and surrounded by the edge region 118.

The layers 114 are preferably connected to one another in fluid-tight manner in the edge region 118, in particular being seal welded.

Further, preferably a plurality of spray-through openings 122 is arranged and/or made in the edge region 118, and by means of these the cooling element 110 is configured to be fixed to a carrier element, to be described in more detail below.

The layers 114 each have one or more, for example two, passage apertures 124 through which the internal space 120 of the cooling element 110 is accessible.

The passage apertures 124 are in particular surrounded by a collar 126 that is formed from the respective layer 114 and forms a spigot 128 for receiving a connecting element 130.

A connecting element 130 serves in particular to connect two cooling elements 110 that succeed one another in the stack direction 104.

For this purpose, the connecting element 130 includes in particular two joining portions 132, each of which is configured to be pushed into a respective spigot 128 of the respective cooling element 110.

The connecting element 130 is thus in particular a push-in element 134 for pushing into the spigots 128 of the cooling elements 110.

For example one or more radial positioning projections 136 of the connecting element 130 are made and/or arranged substantially centrally in relation to the stack direction 104.

The radial positioning projections 136 form in particular abutments for positioning the two cooling elements 110 in relation to one another in the stack direction 104.

Thus, the connecting element 130 is at the same time a positioning element 138 for positioning the cooling elements 110 relative to one another in relation to the stack direction 104 and/or relative to two directions extending perpendicular thereto.

As can be seen in particular from FIG. 7, the layers 114 of each cooling element 110 take a form that, in relation to a centre plane 140, is mirror-symmetrical at least in certain regions, preferably substantially completely.

The spigots 128 for arranging the connecting elements 130 are thus arranged linearly successively in the stack direction 104, the final result of which is that a fluid duct 142, for example a supply duct 144 and/or a discharge duct 145, is formed in combination with the connecting elements 130.

A coolant can be supplied to the internal spaces 120 of the cooling elements 110 or discharged therefrom by way of the fluid duct 142.

One or more sealing elements 146 preferably serve for sealing in the contact region between the connecting elements 130 and the spigots 128. In particular, sealing elements 146 taking the form of O rings are provided.

A base body 148 of each connecting element 130 preferably has annular grooves for receiving the sealing elements 146.

As can be seen in particular from FIGS. 2, 3, 7 and 9, the cell stack 102 includes a plurality of carrier elements 150 for receiving and fixing the cooling elements 110.

In particular, each cooling module 112 includes respectively a carrier element 150 and a cooling element 110 arranged thereon.

The carrier elements 150 form in particular frame elements 152 that surround the respective cooling element 110 in a peripheral direction 154 in the manner of a frame, and are fixed to the respective cooling element 110 by being moulded onto it by a plastics injection moulding method.

The carrier elements 150 are thus in particular injection moulded plastics components.

Figure 4:
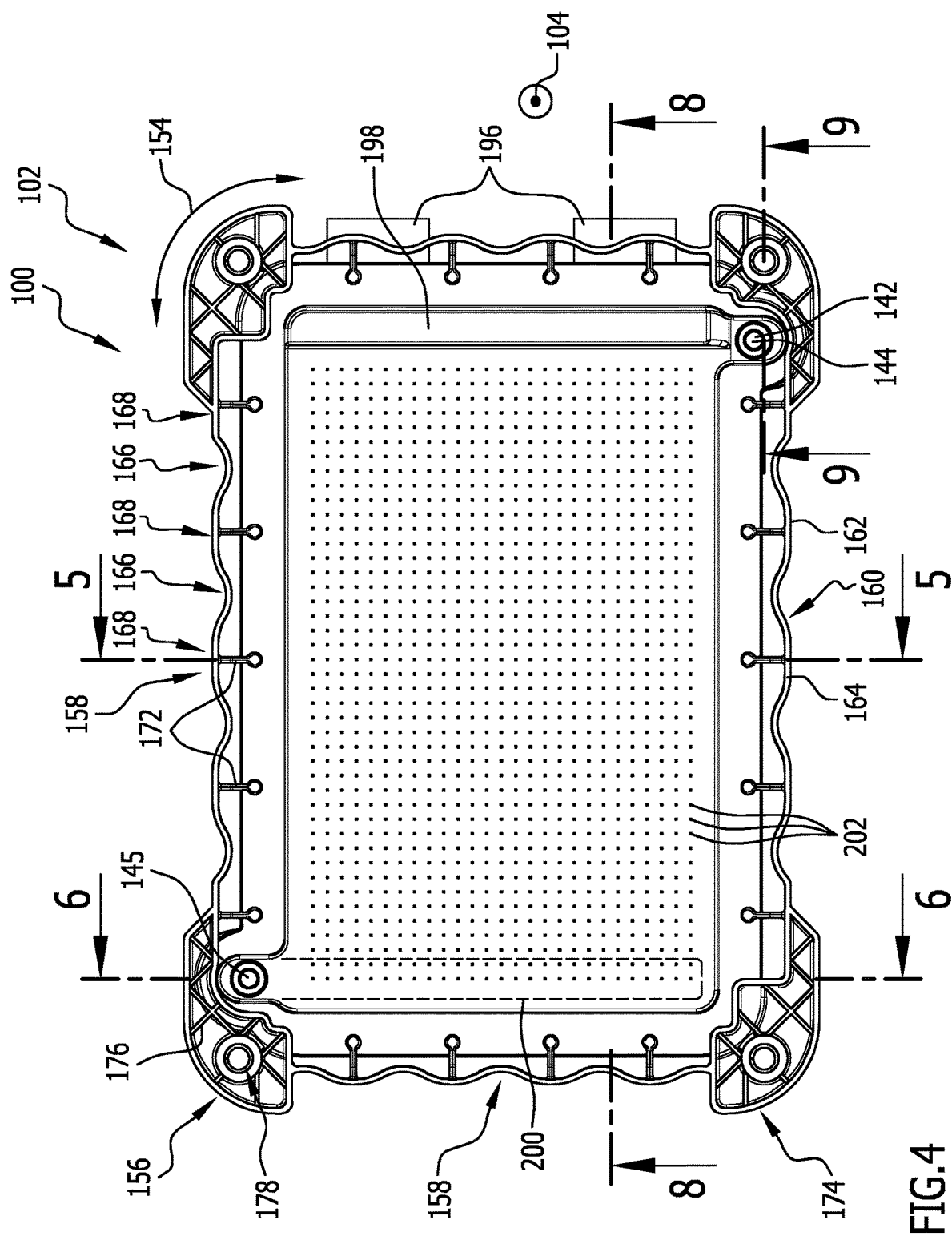
FIG. 4 shows a schematic plan view of a cooling module of the cell stack, with the direction of view in a stack direction of the cell stack.

As can be seen in particular from FIG. 4, each carrier element 150 includes a plurality, for example four, corner elements 156, wherein in each case two corner elements 156 are connected to one another by means of a respective side part 158.

Mutually opposing side parts 158 are preferably arranged substantially parallel to one another.

Side parts 158 that are connected to one another by means of a corner element 156 are preferably arranged at an angle of approximately 90° to one another.

The corner elements 156 are moulded in particular directly onto the edge region 118 of the cooling element 110, and in so doing are secured thereto such that they are immovable in relation to the cooling element 110.

The side parts 158 preferably include wall portions 160 of a wall 162 of a housing 164 to be described below.

The wall portions 160 connect to one another the two corner elements 156 that delimit the respective side part 158 in the peripheral direction 154.

The wall portions 160 of each side part 158 preferably take an undulating form. As a result, in particular compensation regions 166 are formed for the equalisation of changes in expansion caused by temperature.

The compensation regions 166 thus in particular enable deformation of the wall portion 160 of each side part 158, as a result of which the spacings between the corner elements 156 can be varied. This preferably allows the different expansion coefficients of the carrier element 150 made of plastics material, on the one hand, and the cooling element 110, which is made for example from metal, on the other, to be compensated.

The side parts 158 preferably include anchoring portions 168 by means of which the side parts 158 are fixed to the edge region 118 of the respective cooling element 110.

The anchoring portions 168 here each include a moulded-on element 170, which is applied directly on the edge region 118 of the cooling element 110 and extends for example through a spray-through opening 122 in the edge region 118.

The moulded-on element 170 is thus in particular fixed to the cooling element 110 with positive engagement.

A respective web element 172 preferably connects a moulded-on element 170 to the wall 162, in particular the wall portion 160 of the respective side part 158.

The wall 162 is thus preferably arranged at a spacing from the edge region 118 of the cooling elements 110 in the region of the side parts 158.

The corner elements 156 preferably include a stacking region 174 on which a plurality of identically formed carrier elements 150 are stackable on top of one another and in particular abut directly against one another.

Each stacking region 174 includes for example a reinforcing region 176 by means of which the respective corner element 156 is stabilised in the stack direction 104.

Further, the corner elements 156 include a clamping portion 178 that is arranged in particular in the region of the stacking region 174.

In particular, the clamping portion 178 serves to guide a clamping element 180 through the respective corner element 156 in order ultimately to provide a clamping device 182 by means of which the carrier elements 150 can be clamped together in the stack direction 104.

Further, for this purpose the clamping device 182 preferably also includes one or more clamping plates 184, which are formed in particular by two end plates 186 at both ends of the cell stack 102, and enable force to be introduced into the carrier elements 150 evenly.

The clamping elements 180 of the clamping device 182 are for example clamping rods 188 or threaded rods 190 that are terminated in particular by one or more threaded nuts 192 and thus enable the carrier elements 150 to be clamped together in the stack direction 104.

Figure 5:
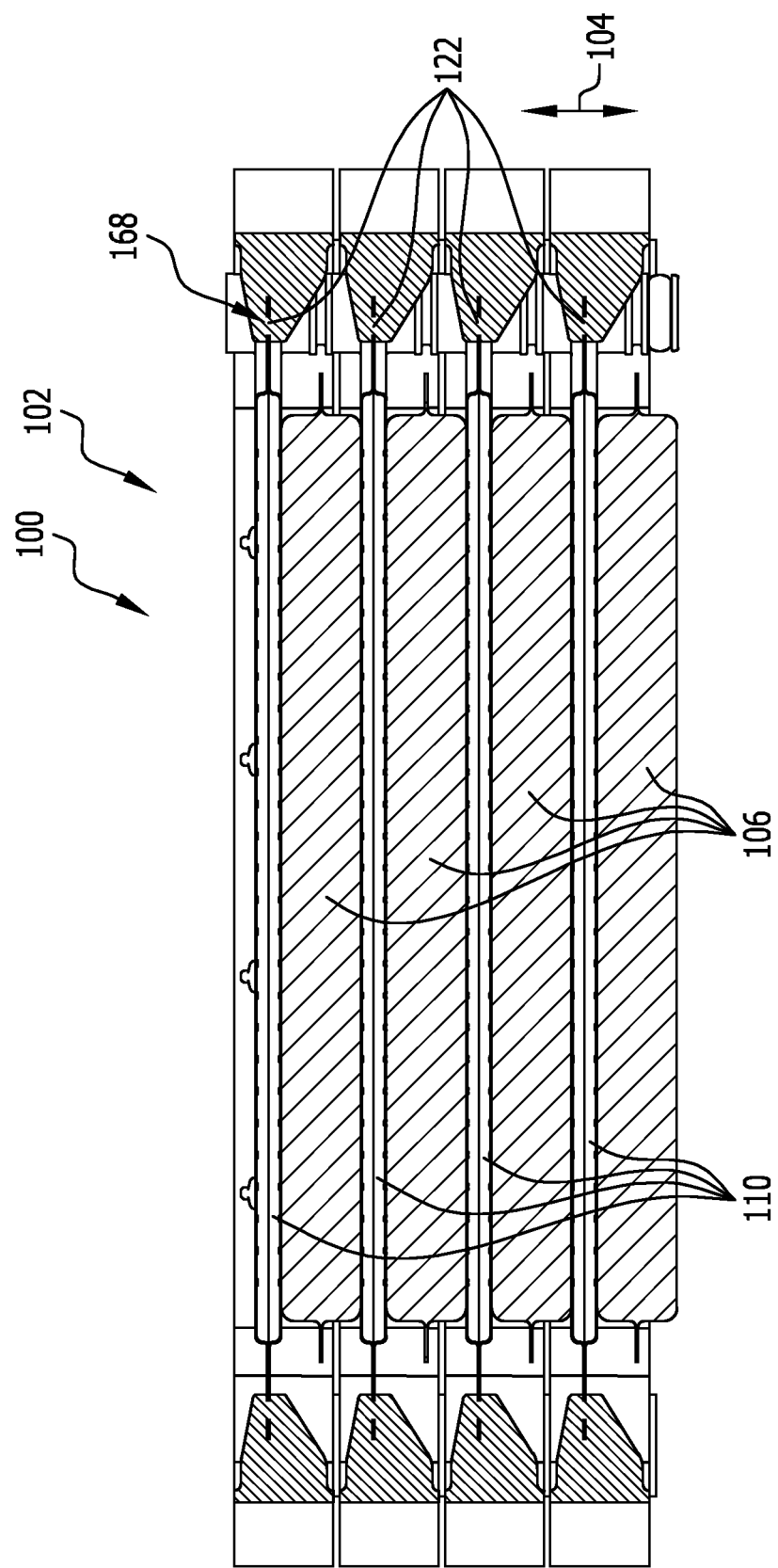
FIG. 5 shows a schematic section through the cell stack, along the line 5-5 in FIG. 4.
Figure 8:
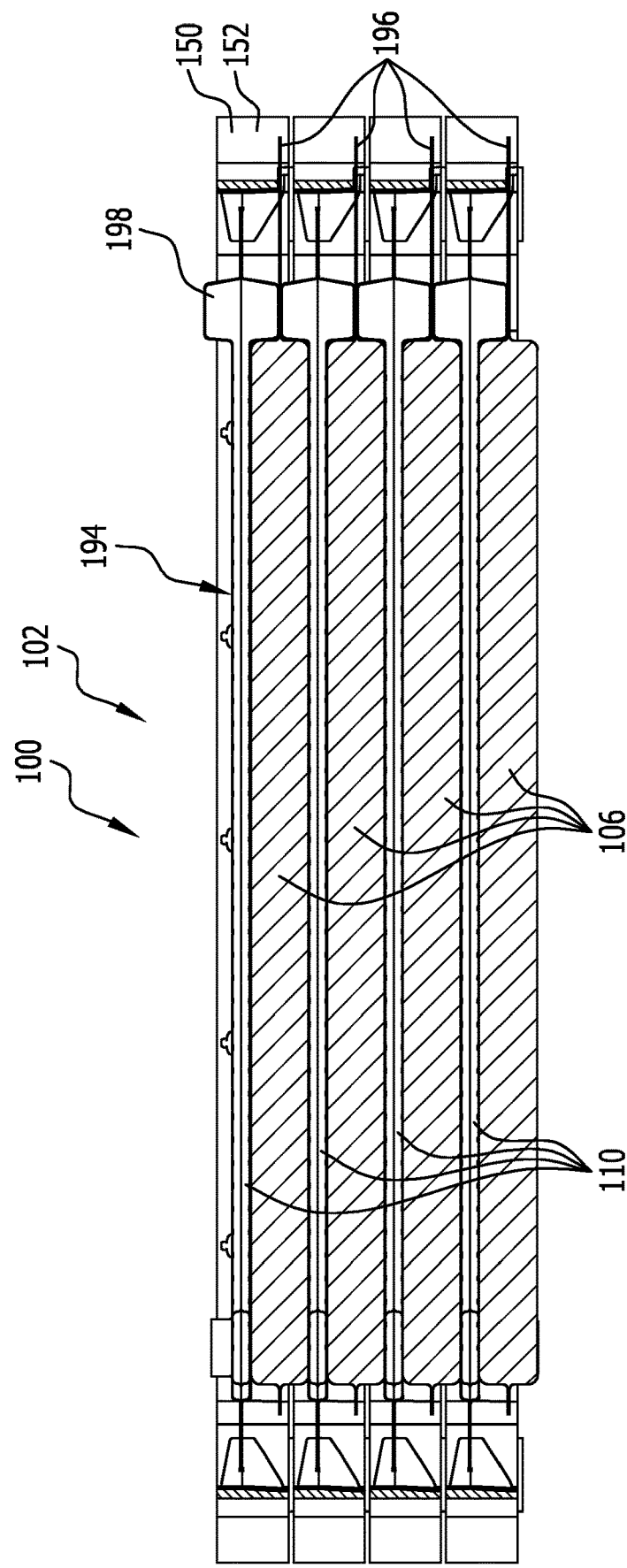
FIG. 8 shows a schematic section through the cell stack, along the line 8-8 in FIG. 4.
Figure 9:
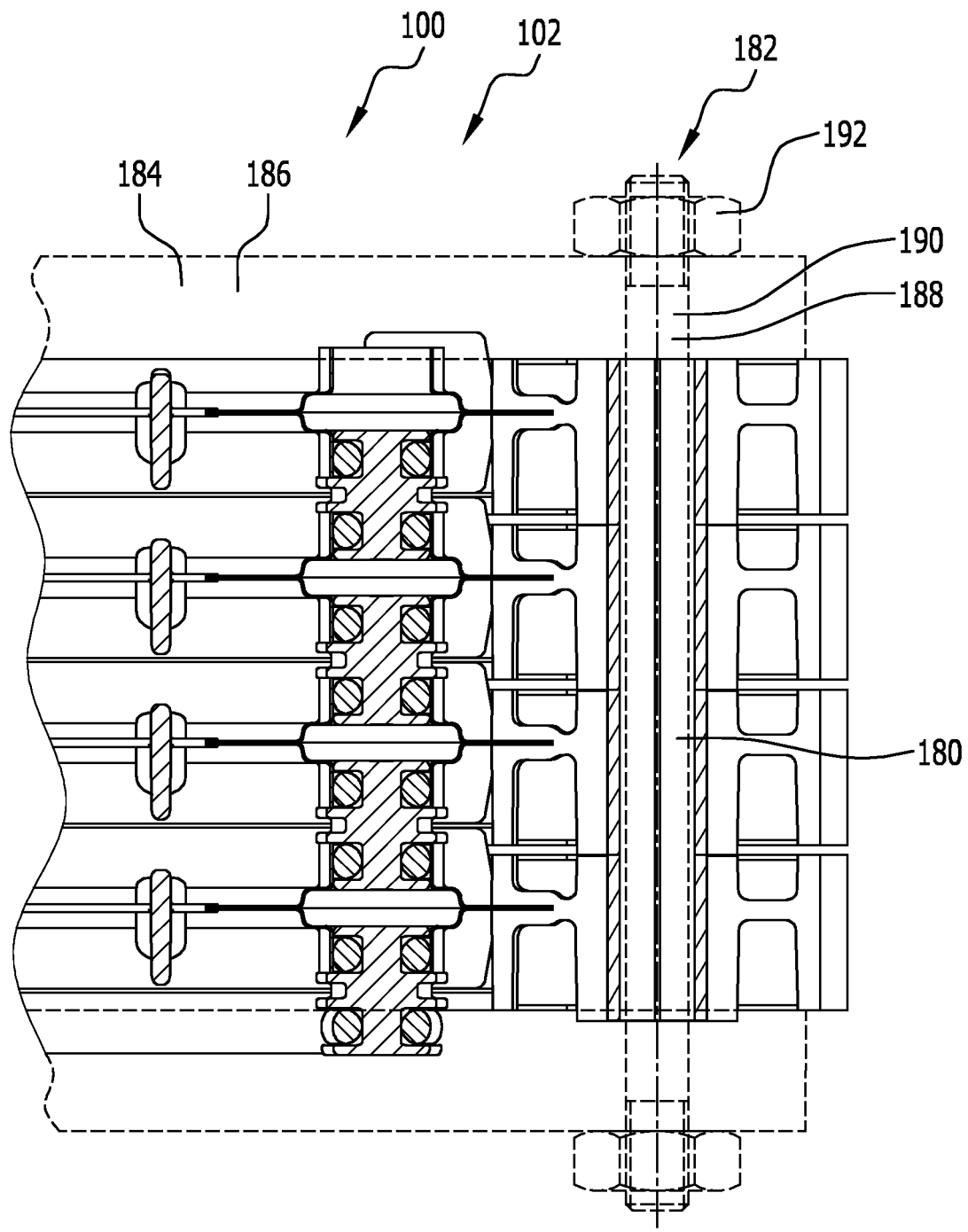
FIG. 9 shows a schematic section through the cell stack, along the line 9-9 in FIG. 4.

As can be seen in particular from FIGS. 3, 5 and 8, the cells 106 are preferably merely inserted between two respective cooling elements 110, for example being held therein.

An additional lateral fixing for the cells 106, in one or more directions extending perpendicular to the stack direction 104, is preferably not provided.

The cooling elements 110 in particular include a central heat transfer region 194 that is surrounded by the edge region 118 and in which the cooling elements 110 abut against the cells 106.

In particular, the cells 106 are held between the heat transfer regions 194 of two cooling elements 110 and are thus positioned in the stack direction 104.

A thickness $D_Z$ of the cell 106 and a thickness $D_K$ of a cooling element 110 and a stack height H of the carrier element 150 are preferably selected such that the two thicknesses $D_Z$ and $D_K$ together substantially correspond to the stack height H.

As a result, the carrier elements 150 can be laid directly on top of one another and thus stacked, while at the same time the cells 106 are positioned, in particular being held, in a closely abutting manner between the cooling elements 110.

Cell terminals 196 of the cells 106 are guided out of the cell stack 102 to the outside in particular through recesses or passage apertures in the carrier elements 150, provided for this purpose.

As can further be seen for example from FIGS. 4 and 8, the cooling elements 110 include for example a distributor duct 198 for evenly distributing supplied coolant to the heat transfer region 194.

Optionally, a collecting duct 200, indicated in FIG. 4, can moreover be provided for the purpose of bringing together coolant to be discharged from the heat transfer region 194.

When the electrical energy storage device 100 is in operation, fluctuations in the expansion of the cells 106 may occur, which depend in particular on the respective operating state, charging state and/or ageing state of the cells 106.

The fluctuations in expansion result in particular in varying thicknesses $D_Z$ of the cells 106.

In order to compensate for these fluctuations in expansion, the cooling elements 110 preferably take a flexible form such that if the cells 106 expand, the cooling elements 110 can preferably be compressed. As a result, reliable abutment and thus reliable heat transfer can be ensured even in the event of varying expansions of the cells 106.

Moreover, this preferably results in a reliable holding action for positioning the cells 106 between the cooling elements 110.

However, optimum cooling can only be ensured if coolant can always flow through the cooling elements 110.

For this purpose, the cooling elements 110 are preferably provided with spacers 202.

The spacers 202 take the form for example of projections or other bulges or indentations in the layers 114 of the cooling elements 110, and in the event of too great a compression of the respective cooling element 110 they come into abutment with the respectively opposing layer 114. The possibility that the two layers 114 will abut flat against one another can thus be prevented. In this way, it is also possible to effectively avoid the stream of coolant being interrupted.

Figure 6:
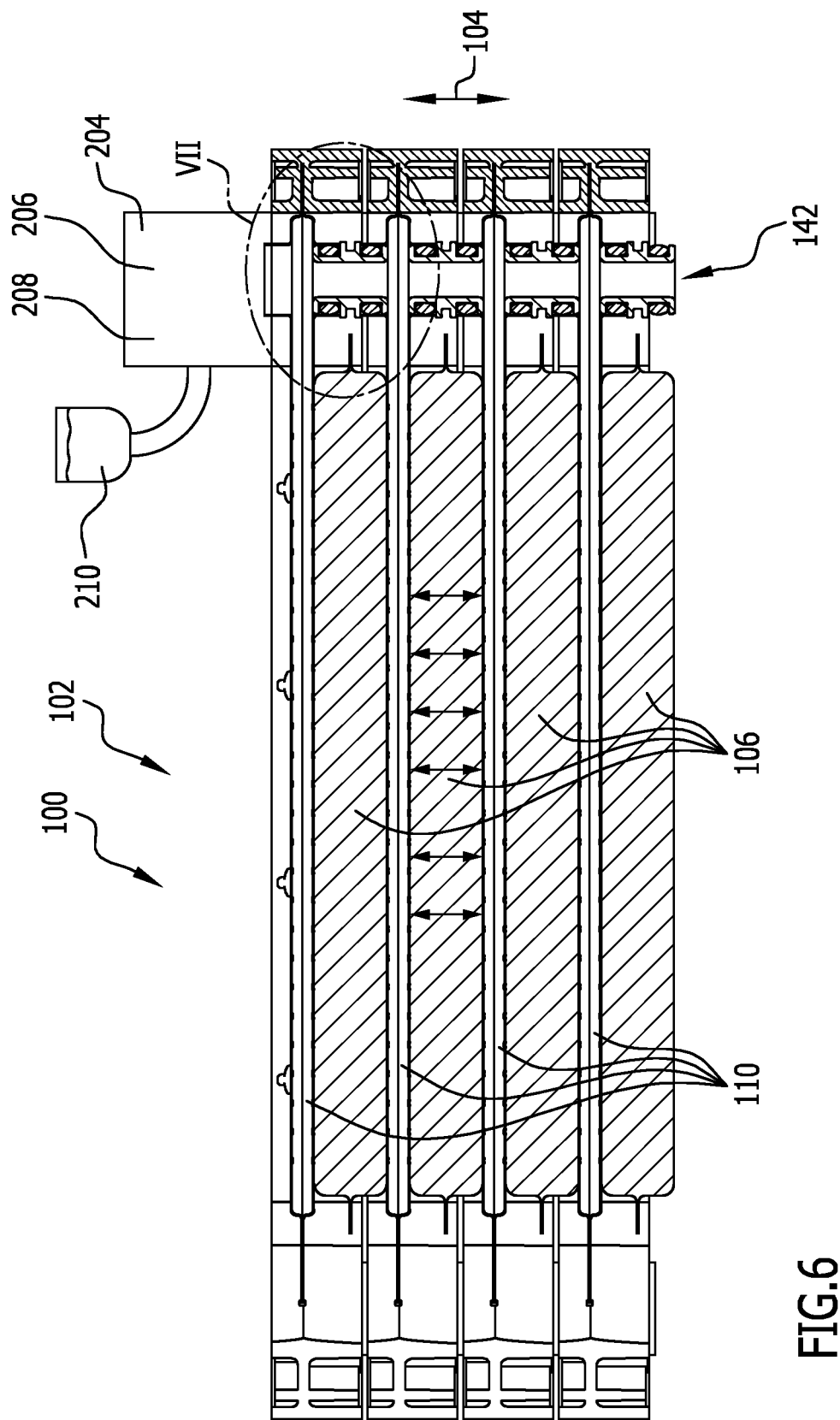
FIG. 6 shows a schematic section through the cell stack, along the line 6-6 in FIG. 4.

As can be seen in particular from the schematic illustration in FIG. 6, the cell stack 102 further preferably includes a pumping device 204 by means of which a stream of coolant is configured to be driven through the cooling elements 110.

Further, a fluid pressurisation device 206 is preferably provided by means of which a pressure within the cooling elements 110 can be controlled by open and/or closed-loop control.

In particular, this enables the cooling elements 110 to abut reliably against the cells 106 without exerting too great a pressure on the cells 106.

Further, preferably a condition of the cells 106 can be determined by means of a measuring device 208.

For example, a quantity of coolant that is currently found within the cooling elements 110 can be determined by way of a equalisation tank 210 of the measuring device 208. It is possible to deduce from this quantity the current volume of the internal spaces 120 of the cooling elements 110 and thus the expansion of the cooling elements 110 and the cells 106.

The expansion of the cells 106 can in turn be utilised in particular in combination with further parameters such as the temperature and/or an internal cell pressure to determine a current condition of the cell 106.

As a result of the features described above of the electrical energy storage device 100, the cell stack 102 and/or the cooling module 112, preferably optimised cooling of the cells 106 and/or simplified construction and/or efficient and reliable operation of the entire device can be made possible.

The invention claimed is:

1. A cooling module for a cell stack, the cooling module comprising:
    a cooling element for receiving and passing on a coolant, wherein
    the cooling module includes a carrier element to which the cooling element is fixed,
    the carrier element is or includes an injection moulded plastics element that is fixed to the cooling element by being moulded onto the cooling element, wherein the carrier element is a frame element that surrounds the cooling element in a peripheral direction,
    the carrier element includes one or more side parts that each include one or more compensation regions,
    the one or more compensation regions are elastically deformable in the peripheral direction of the carrier element,
    the one or more side parts include or form one or more outer wall portions of the frame, and
    at least one of the outer wall portions of the frame element has an undulating form.

2. A cooling module according to claim 1, wherein the carrier element includes one or more corner elements that are in particular moulded directly onto the cooling element.

3. A cooling module according to claim 1, wherein the carrier element includes one or more stacking regions by means of which a plurality of carrier elements of the same construction are stackable on top of one another in a stack direction.

4. A cooling module according to claim 3, wherein the one or more stacking regions each include at least one reinforcing region and/or at least one clamping portion for clamping a plurality of carrier elements together by means of a clamping device.

5. A cooling module according to claim 1, wherein the carrier element includes one or more side parts that each include one or more anchoring portions for anchoring the carrier element on the cooling element.

6. A cooling module according to claim 5, wherein the one or more anchoring portions each include the following:
one or more moulded-on elements, which are moulded directly onto the cooling element; and
one or more web elements for connecting the moulded-on elements to the wall portion of a side part of the carrier element.

7. A cooling module according to claim 1, wherein the carrier element includes one or more side parts that each include a plurality of anchoring portions and a plurality of compensation regions, wherein the anchoring portions and the compensation regions are arranged alternately in a peripheral direction of the carrier element in which the carrier element surrounds the cooling element.

8. A cooling module according to claim 1, wherein the carrier element includes four corner elements and four side parts, each connecting two corner elements to one another, wherein the corner elements and the side parts jointly form the frame element surrounding the cooling element.

9. A cooling module according to claim 1, wherein the carrier element forms the wall portion of a housing of a cell stack and/or an electrical energy storage device.

10. A cell stack, in particular an accumulator cell stack, wherein the cell stack includes the following:
a plurality of cells, in particular accumulator cells; and
a plurality of cooling modules according to claim 1, for cooling the cells.

11. A cell stack according to claim 10, wherein a stack height of the carrier element corresponds at least to a total of a thickness of at least the cooling element in a heat transfer region and a thickness of at least one cell.

12. A cell stack according to claim 10, wherein, in the stacked condition, the carrier elements of the cooling modules form a side wall of a housing encasing the cells and the cooling elements, wherein the side wall is at least approximately uninterrupted in both a stack direction and a peripheral direction.

13. A cell stack according to claim 10, wherein the cell stack includes a stack of carrier elements that is provided at both ends with a respective end plate, wherein the two end plates form or include clamping plates between which the carrier elements are clamped together.

* * * * *